US010049076B2

(12) United States Patent
Vucinic et al.

(10) Patent No.: US 10,049,076 B2
(45) Date of Patent: Aug. 14, 2018

(54) METHODS AND SYSTEMS FOR IMPLEMENTING HIGH SPEED SERIAL INTERFACE BUS HAVING INHOMOGENEOUS LANE BUNDLES AND ENCODINGS

(71) Applicant: Western Digital Technologies, Inc., Irvine, CA (US)

(72) Inventors: Dejan Vucinic, San Jose, CA (US); Zvonimir Z. Bandic, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 221 days.

(21) Appl. No.: 15/090,249

(22) Filed: Apr. 4, 2016

(65) Prior Publication Data
US 2016/0292125 A1 Oct. 6, 2016

Related U.S. Application Data

(60) Provisional application No. 62/142,239, filed on Apr. 2, 2015.

(51) Int. Cl.
*G06F 13/00* (2006.01)
*G06F 13/42* (2006.01)
(Continued)

(52) U.S. Cl.
CPC ...... *G06F 13/4291* (2013.01); *G06F 11/3027* (2013.01); *G06F 11/3485* (2013.01)

(58) Field of Classification Search
CPC .................................................. G06F 13/4291
See application file for complete search history.

(56) References Cited

U.S. PATENT DOCUMENTS 6,760,793 B2 * 7/2004 Kelley .................. G06F 13/385
710/29
7,099,969 B2 8/2006 McAfee et al.
(Continued)

OTHER PUBLICATIONS

Boughton, Kris, "PCI Express 2.0: Scalable Interconnect Technology, TNG," Anandtech, retrieved online from URL:http://www.anandtech.com/show/2412/2, 6 pages (Jan. 5, 2008).
(Continued)

*Primary Examiner* — Tammara R Peyton
(74) *Attorney, Agent, or Firm* — Patterson & Sheridan, LLP; Puja Detjen

(57) ABSTRACT

The present disclosure relates to methods and systems for implementing a high-speed serial bus with inhomogeneous lane bundles and encodings. A system for transmitting information can include a bus with a plurality of lanes and a host in communication with a target. The host can run an application that writes data to and reads data from storage. The host can assign a first plurality of lanes and a first encoding to a first bundle and assign a second plurality of lanes and a second encoding to a second bundle. The host can also evaluate a bandwidth requirement for the read and write instructions and evaluate a bus performance. The host can also regroup the first bundle or the second bundle based on bandwidth requirements and bus performance and can assign a third plurality of lanes and a third encoding to the at least one of the first bundle and the second bundle.

20 Claims, 3 Drawing Sheets

(51) Int. Cl.
  *G06F 11/30*  (2006.01)
  *G06F 11/34*  (2006.01)

(56) References Cited

U.S. PATENT DOCUMENTS

| | | |
|---|---|---|
| 7,802,049 B2 | 9/2010 | Levy |
| 8,661,178 B2 | 2/2014 | Richard |
| 2005/0088445 A1 | 4/2005 | Gonzalez et al. |
| 2007/0239925 A1 | 10/2007 | Koishi |
| 2011/0302357 A1 | 12/2011 | Sullivan |
| 2012/0011302 A1 | 1/2012 | Bruening et al. |
| 2014/0003451 A1 | 1/2014 | Wagh et al. |
| 2014/0269881 A1 | 9/2014 | He et al. |
| 2014/0281068 A1 | 9/2014 | Das Sharma et al. |

OTHER PUBLICATIONS

Torres, Gabriel, "Everything You Need to Know About the PCI Express," Parallel Communication, retrieved online from URL:http://www.hardwaresecrets.com/everything-you-need-to-know-about-the-pci-express/3/, 7 pages (Jul. 12, 2012).

\* cited by examiner

METHODS AND SYSTEMS FOR IMPLEMENTING HIGH SPEED SERIAL INTERFACE BUS HAVING INHOMOGENEOUS LANE BUNDLES AND ENCODINGS

CROSS REFERENCE TO RELATED APPLICATIONS

This application claims the benefit under 35 U.S.C. § 119(e) of U.S. Provisional Patent Application No. 62/142,239, filed Apr. 2, 2015, and titled "METHODS AND SYSTEMS FOR IMPLEMENTING HIGH SPEED SERIAL INTERFACE BUS HAVING INHOMOGENEOUS LANE BUNDLES AND ENCODINGS," the contents of which are hereby incorporated by reference in their entirety.

FIELD OF THE DISCLOSURE

The present disclosure relates to systems and methods for implementing a communications protocol for a storage media interface. Specifically, the present disclosure relates to a high-speed serial bus with inhomogeneous lane bundles and encodings that can be dynamically updated.

BACKGROUND

The evolution of computer systems has resulted in the development of various communication protocols to establish communication between a host controller, such as a personal computer, and peripheral devices that can communicate with the host controller. For example, serial and parallel ports, SCSI, Universal Serial Bus (USB), Peripheral Component Interconnect (PCI/PCI-X), PCI-express (PCIe), PMBus, EIDE, SATA, IEEE 1394, and 12C are typical communication protocols between host controllers and peripheral devices. As communication protocols grow in bandwidth, the physical limitations of high bit rate signaling over long distances necessitate sophisticated encoding and bundling of multiple independent signaling lanes to achieve the high design bandwidths.

For example, the first-generation PCI Express (PCIe) bus specification provides a 2.5 GT/s (giga-transfers per second) rate and an "8b/10b" encoding. Accordingly, the symbol size is ten bits long and the transfer of eight bits on a single lane incurs a latency of 4 ns (10/2.5 G/s), neglecting the 24 bytes of packet header overhead. Without error correction, there is minimal overhead to make these bits available to a computation engine on the peripheral device, which includes deserialization and latching of the data.

The third-generation PCI Express (PCIe) bus specification provides a 8 GT/s rate. Accordingly, compared to the first-generation PCIe, it would have been expected that the latency would drop to 31% (2.5/8) based solely on the higher bit rate. However, the third-generation PCIe specification provides an "128b/130b" encoding to better utilize the physical bandwidth of the communication medium. For example, an "128b/130b" encoding wastes 1.5% (2/130) of bandwidth, while an "8b/10b" encoding wastes 20% (2/10). However, because of the increased symbol size (130 bits), a minimal chunk (130 bits) of communication incurs a latency of 16.25 ns (130/8 G/s), which is more than four times longer compared to the minimal chunk of communication in the first-generation PCIe (10 bits). Moreover, to use 4 or 8 independent lanes in parallel, the receiver should time-align the independent lanes and rearrange the bits to present to the device, which in a typical FPGA implementation can take on the order of 400 ns. Therefore, communicating a few bits of information across a high bandwidth interface can be significantly costly in terms of latency and throughput.

This can present a problem for storage protocols because, for small data packet operations, for example, 8 bit data packet operations, a large fraction of all communication across the bus can be the exchange of a few bits at a time to synchronize protocol queues between the host and the device.

Accordingly, flexible and dynamic high speed bus architectures are desirable that can be optimized to enable short communication latency for small data transfers, as well as, high-bandwidth communication for bulk data transfers.

SUMMARY

The present disclosure relates to methods and systems for implementing a high-speed serial bus with inhomogeneous lane bundles and encodings that can be dynamically updated during operation of the high-speed serial bus.

One embodiment can include a system for transmitting information in a communications protocol. The system can include a bus with a plurality of lanes that can be grouped in one or more bundle of lanes and a host in communication with a target via the bus. According to embodiments, the host can run an application that writes data to and reads data from a storage in communication with the target, where the host can be configured to assign a first plurality of lanes and a first encoding to a first bundle having a first bandwidth and assign at least one lane and a second encoding to a second bundle having a second bandwidth. The host can be further configured to evaluate a bandwidth requirement for at least one of application read instructions and application write instructions and evaluate a bus performance. The host can be further configured to assign a third plurality of lanes and a third encoding to the first bundle based on at least one of the bandwidth requirement and the bus performance.

According to embodiments, the host is further configured to assign a fourth plurality of lanes and a fourth encoding to the second bundle based on at least one of the bandwidth requirement and the bus performance.

According to embodiments, the host is further configured to power down the first bundle based on at least one of the bandwidth requirement and the bus performance.

According to embodiments, the bus further comprises at least one control signal for controlling the first bundle and the second bundle.

According to embodiments, a number of lanes in the first plurality of lanes is negotiated between the host and the target.

According to embodiments, the bus performance is evaluated based on a bus utilization.

According to embodiments, the second bundle is configured to communicate control signals.

According to embodiments, at least one of a number of lanes in the first plurality, a symbol length, a bandwidth, an encoding, a cyclic redundancy check, and an error-correcting code of the first bundle can dynamically change during running of the application.

According to embodiments, the first bundle comprises sixteen lanes and implements an 128b/130b encoding and the second bundle comprises one lane and implements an 8b/10b encoding.

According to embodiments, the first bundle is a clock-data-recovery bundle and the second bundle is a source-synchronous bundle.

Another embodiment can include a method for transmitting information in a communications protocol. The method can include the steps of providing a bus comprising a plurality of lanes that can be grouped in at least one bundle of lanes and providing a host in communication with a target via the bus, the host running an application that writes data to and reads data from a storage in communication with the target. The method can also include the steps of assigning a first plurality of lanes and a first encoding to a first bundle having a first bandwidth and assigning at least one lane and a second encoding to a second bundle having a second bandwidth. The method can also include the steps of evaluating a bandwidth requirement for at least one of application read instructions and application write instructions, evaluating a bus performance, and assigning, by the host, a third plurality of lanes and a third encoding to the first bundle based on at least one of the bandwidth requirement and the bus performance.

According to embodiments, the method can also include assigning a fourth plurality of lanes and a fourth encoding to the second bundle based on at least one of the bandwidth requirement and the bus performance.

According to embodiments, the method can also include powering down the first bundle based on at least one of the bandwidth requirement and the bus performance.

According to embodiments, the bus further comprises at least one control signal for controlling the first bundle and the second bundle.

According to embodiments, the method can also include negotiating a number of lanes in the first plurality of lanes between the host and the target.

According to embodiments, the bus performance is evaluated based on a bus utilization.

According to embodiments, the method can also include configuring the second bundle to communicate control signals.

According to embodiments, the method can also include dynamically changing during running of the application at least one of a number of lanes in the first plurality, a symbol length, a bandwidth, an encoding, a cyclic redundancy check, and an error-correcting code of the first bundle.

According to embodiments, the first bundle comprises sixteen lanes and implements an 128b/130b encoding and the second bundle comprises one lane and implements an 8b/10b encoding.

According to embodiments, the first bundle is a clock-data-recovery bundle and the second bundle is a source-synchronous bundle.

BRIEF DESCRIPTION OF THE DRAWINGS

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the invention, the scope of which is set forth in the claims that follow.

DETAILED DESCRIPTION

Methods and systems are provided for implementing flexible and dynamic high speed bus architectures that can be optimized to enable short communication latency for small data transfers, as well as, high-bandwidth communication for bulk data transfers, for example, data transfers for performance-critical applications such as 3D graphics, networking (10-gigabit Ethernet, multiport gigabit Ethernet), and enterprise storage (SAS, Fibre Channel). According to aspects of the present disclosure, the communication lanes of a high speed serial bus can be grouped into different bundles of different widths and/or data encodings, according to the requirements of a particular data transfer or application running on a host.

Figure 1:
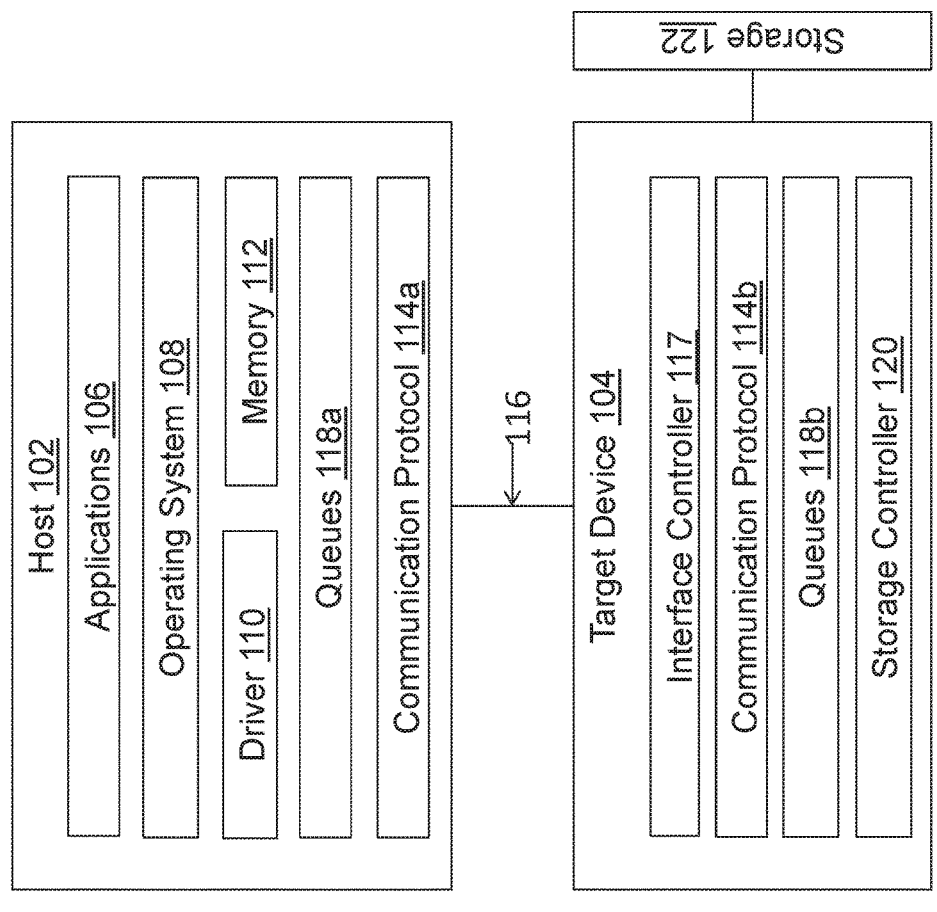
FIG. 1 illustrates an exemplary system implementing a communication protocol, in accordance with embodiments of the present disclosure.

FIG. 1 illustrates an exemplary system 100 implementing a communication protocol, in accordance with embodiments of the present disclosure. System 100 includes host 102 in communication with target device 104 and storage 122. Host 102 includes user applications 106, operating system 108, driver 110, host memory 112, queues 118a, and communication protocol 114a. Target device 104 includes interface controller 117, communication protocol 114b, queues 118b, and storage controller 120 in communication with storage 122.

Host 102 can run user-level applications 106 on operating system 108. Operating system 108 can run driver 110 that interfaces with host memory 112. In some embodiments, memory 112 can be dynamic random access memory (DRAM). Host memory 112 can use queues 118a to store commands from host 102 for target 104 to process. Examples of stored or enqueued commands can include read operations from host 102. Communication protocol 114a can allow host 102 to communicate with target device 104 using interface controller 117.

Target device 104 can communicate with host 102 using interface controller 117 and communication protocol 114b, over interface 116. Communication protocol 114b can provide queues 118 to access storage 122 via storage controller 120.

The communication protocol 114b can include multiple independent bundles of high speed serial lanes. For example, communication protocol 114b can include a single lane at a low bit rate and an encoding that can add minimal overhead for small data transfers, and a large, e.g., 8-lane bundle at a high bit rate and very long symbol encoding that can optimize the utilization of physical bandwidth and the transmit/receive power for bulk transfers.

Breaking the communication protocol 114b into multiple independent bundles can further allow better power management of each bundle. For example, the low-latency bundle can be operative all the time to allow low-latency queue management, while the high-bandwidth bundle can be woken up only when a high-bandwidth is scheduled. Therefore, the transceivers of the lanes of the high-bandwidth bundle can be normally shut down to save power at times of low-load communication.

As discussed above, an exemplary communication protocol is PCI Express (PCIe). PCIe is a point-to-point protocol with separate serial links that can connect one or more devices to a host, each device or host being an endpoint. Each PCIe link can support full-duplex communication between any two endpoints. The PCIe link between two devices can consist of anywhere from 1 to 32 lanes. In a multi-lane link, the peak data-throughput scales with the overall link width.

The lane count of each PCIe link can be automatically negotiated between two endpoints during device initialization and can be restricted by either endpoint. For example, during the initialization cycle the two endpoints can negotiate the highest mutually supported lane count.

Figure 2:
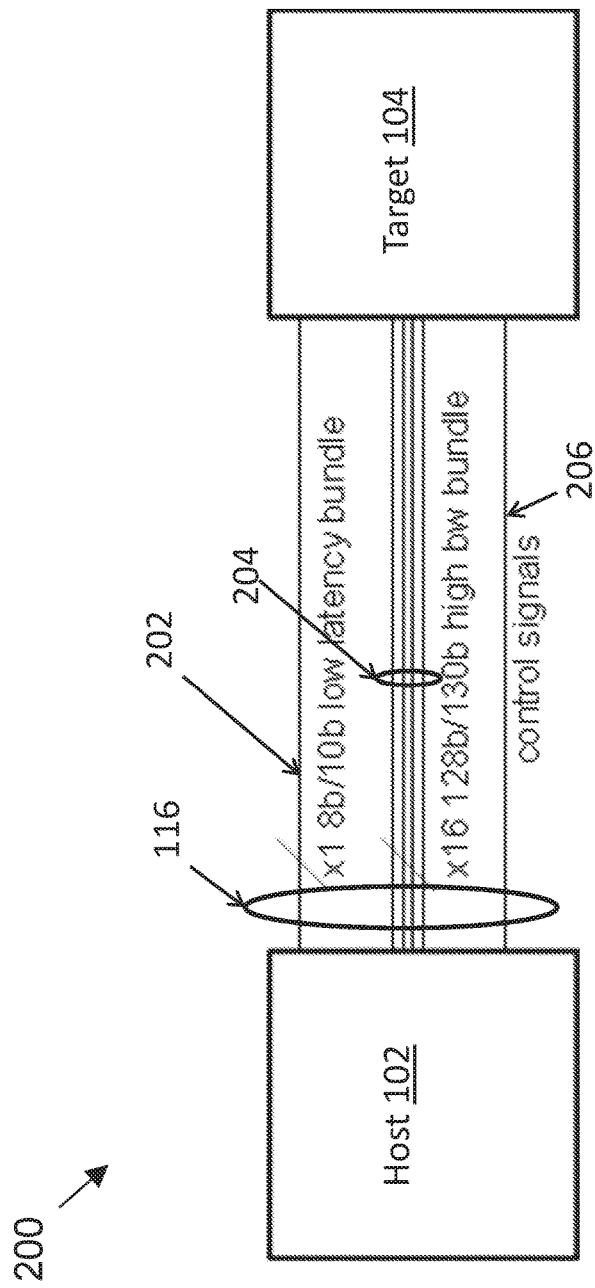
FIG. 2 illustrates an exemplary system implementing a high speed bus with inhomogeneous lane bundles, in accordance with embodiments of the present disclosure.

FIG. 2 illustrates an exemplary system 200 implementing a high speed bus with inhomogeneous lane bundles. Specifically, FIG. 2 shows host 102 in communication with target 104 over interface 116. As illustrated, interface 116 can be a high speed serial bus with a single-lane bundle 202 and a sixteen-lane bundle 204. Interface 116 can also include one or more control signals 206. For example, control signals 206 can include multiple independent signaling lanes to provide controlling of the different bundles.

The single-lane bundle 202 can achieve lower latency for small transfers by utilizing the shorter-symbol 8b/10b encoding. The sixteen-lane bundle 204 can have high bandwidth and a high "128b/130b" encoding that can better utilize the transmission and reception power for bulk transfers. The disclosed systems and methods can route traffic to the most appropriate bundle. In addition, low-latency storage can be exposed to the host at lower minimal latency, e.g., a one-byte lookup would take a much shorter time using 8b/10b encoding than the longer symbol but more bandwidth-efficient 128b/130b encoding.

FIG. 2 illustrates an exemplary grouping of lanes into two bundles. Persons skilled in the art would understand that the grouping on the lanes can be different from the one illustrated in FIG. 2, for example, to include more than two lane bundles.

According to aspects of the present disclosure, the groupings of the communication protocol lanes can change during operation, according, for example, to the communication requirements of the application running on the host. For example, if the application running on the host requires high bandwidth links with the target, interface 116 can be reconfigured to include more than one high bandwidth bundles with appropriate widths and encodings.

According to aspects of the present disclosure, the properties of the different bundles, such as, width, symbol length, bandwidth, encoding, cyclic redundancy check (CRC), and error-correcting code (ECC), can dynamically change during operation. In addition, the disclosed high speed serial bus can have independent rate and power management for the different bundles. Accordingly, the disclosed systems and methods can provide flexible power scaling, for example, by powering down a high-bandwidth bundle, when the load is low. Moreover, the disclosed systems and methods can use a narrow bundle as a frequency reference to reduce the time it takes to retrain the high-bandwidth bundle 204.

Figure 3:
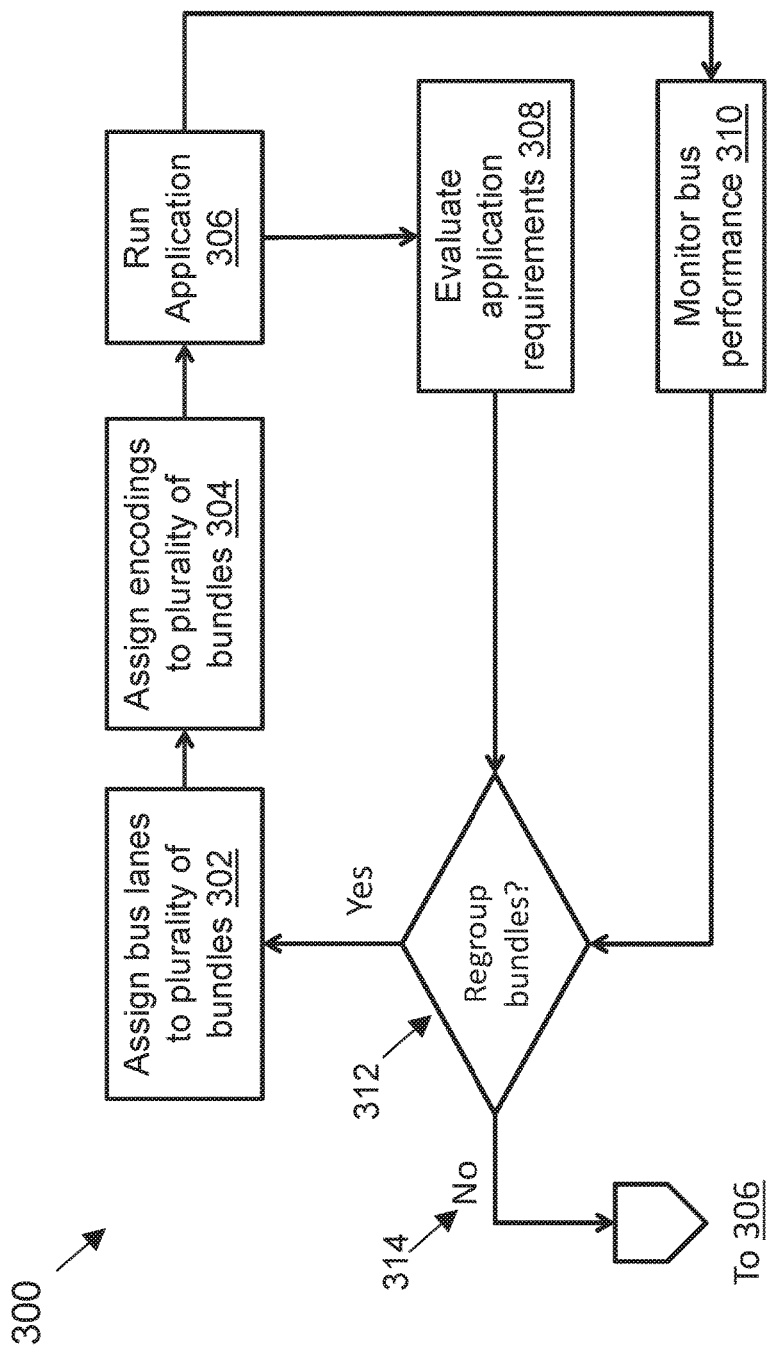
FIG. 3 illustrates an exemplary method for dynamically updating the architecture of a high speed bus, in accordance with embodiments of the present disclosure.

According to aspects of the disclosure, FIG. 3 illustrates an exemplary method 300 for dynamically updating the architecture of a high speed bus. Specifically, the host can initially assign bus lanes to two or more bundled (step 302) to create two or more groups according to the requirements of the application running on the host. Then the host can assign appropriate encodings to the bundles (step 304) and run the host application (step 306). After the initial grouping, the host can periodically evaluate the application requirements (step 308) and monitor the bus performance, e.g., bus utilization (step 310). If the host determines that the application requirements have changed or a different application is running on the host that would benefit from a different allocation of bus lanes, then it can determine whether it would be preferable to regroup the lane bundles (step 312). While the host application is running, the host can also monitor the bus performance (step 310) and can similarly determine that it would be preferable to regroup the lane bundles (step 312). In this case, the host can assign the bus lanes into different bundles and can also assign different encodings to the bundles. If the host determines that no regrouping is necessary (step 314), then it can continue running the application with the existing bus architecture.

Clock-data-recovery (CDR) serial links, such as PCIe and HMC, have some benefits and problems when compared to source-synchronous parallel buses, such as DDR DRAM. For example, the DDR2/3 DRAM interface is synchronous to a single clock provided by the host, which typically can be re-clocked on the memory chip to reduce jitter and drift. The maximum data transfer rates that can be achieved using such a scheme are below 2.6 GT/s per copper trace, e.g., DDR3-2600. In contrast, with a CDR serial link, the data transfer can be over 20 GT/s over a single pair of copper traces, depending on trace length and circuit board material. This results in a lot less copper material and a lot less power per bit, while the data is flowing.

On the other hand, once a CDR link is brought down, for example, to reduce power, it can take a significant delay, e.g., 50 µs, to retrain the PLL on the other end of each wire pair and to reestablish the state of the encoder/decoder. With a DDR3 interface there is no retraining and the link can effectively be up in about 1.5 clock cycles, which can result in 10s of nanoseconds latency.

According to aspects of the disclosure, the disclosed methods and systems can address the long bring-up latency of CDR serial links with a "thin" low-latency bundle, which can be always up. This low-latency bundle can be used for exchanging commands and can also be used small data packets, for example, up to a given bandwidth threshold. When the bandwidth for a particular data exchange exceeds a threshold, then a "big" bundle can be brought up to complete the data exchange.

According to alternative aspects, the disclosed methods and systems can use inhomogeneous bundles to satisfy different bandwidth and power requirements. For example, one bundle can be a CDR bundle for bulk data at low average power, while another bundle can be source-synchronous, such as a DDR parallel bundle, for law latency transfers.

Those of skill in the art would appreciate that the various illustrations in the specification and drawings described herein can be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware, software, or a combination depends upon the particular application and design constraints imposed on the overall system. Skilled artisans can implement the described functionality in varying ways for each particular application. Various components and blocks can be arranged differently (for example, arranged in a different order, or partitioned in a different way) all without departing from the scope of the subject technology.

Furthermore, an implementation of the communication protocol can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The methods for the communications protocol can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this communications protocol can be embodied in other specific forms without departing from the spirit or essential attributes thereof, and accordingly, reference should be had to the following claims, rather than to the foregoing specification, as indicating the scope of the invention.

The communications protocol has been described in detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

The invention claimed is:

1. A system for transmitting information in a communications protocol, the system comprising:
    a bus comprising a plurality of lanes that can be grouped in at least one bundle of lanes; and
    a host in communication with a target via the bus, the host running an application that writes data to and reads data from a storage in communication with the target, the host configured to:
        assign a first plurality of lanes and a first encoding to a first bundle having a first bandwidth;
        assign at least one lane and a second encoding to a second bundle having a second bandwidth;
        evaluate a bandwidth requirement for at least one of application read instructions and application write instructions;
        evaluate a bus performance;
        regrouping the first bundle based on the at least one of the bandwidth requirement and the bus performance; and
        assign a third plurality of lanes and a third encoding to the regrouped first bundle based on at least one of the bandwidth requirement and the bus performance, wherein the first bundle and the second bundle are inhomogeneous.

2. The system of claim 1, wherein the host is further configured to assign a fourth plurality of lanes and a fourth encoding to the second bundle based on at least one of the bandwidth requirement and the bus performance.

3. The system of claim 1, wherein the host is further configured to power down the first bundle based on at least one of the bandwidth requirement and the bus performance.

4. The system of claim 1, wherein the bus further comprises at least one control signal for controlling the first bundle and the second bundle.

5. The system of claim 1, wherein a number of lanes in the first plurality of lanes is negotiated between the host and the target.

6. The system of claim 1, wherein the bus performance is evaluated based on a bus utilization.

7. The system of claim 1, wherein the second bundle is configured to communicate control signals.

8. The system of claim 1, wherein at least one of a number of lanes in the first plurality, a symbol length, a bandwidth, an encoding, a cyclic redundancy check, and an error-correcting code of the first bundle can dynamically change during running of the application.

9. The system of claim 1, wherein the first bundle comprises sixteen lanes and implements an 128b/130b encoding and the second bundle comprises one lane and implements an 8b/10b encoding.

10. The system of claim 1, wherein the first bundle is a clock-data-recovery bundle and the second bundle is a source-synchronous bundle.

11. A method for transmitting information in a communications protocol, the method comprising:
    providing a bus comprising a plurality of lanes that can be grouped in at least one bundle of lanes;
    providing a host in communication with a target via the bus, the host running an application that writes data to and reads data from a storage in communication with the target;
    assigning, by the host, a first plurality of lanes and a first encoding to a first bundle having a first bandwidth;
    assigning, by the host, at least one lane and a second encoding to a second bundle having a second bandwidth;
    evaluating, by the host, a bandwidth requirement for at least one of application read instructions and application write instructions;
    evaluating, by the host, a bus performance;
    regrouping the first bundle based on the at least one of the bandwidth requirement and the bus performance; and
    assigning, by the host, a third plurality of lanes and a third encoding to the first bundle based on at least one of the bandwidth requirement and the bus performance wherein the first bundle and the second bundle are inhomogeneous.

12. The method of claim 11, further comprising assigning, by the host, a fourth plurality of lanes and a fourth encoding to the second bundle based on at least one of the bandwidth requirement and the bus performance.

13. The method of claim 11, further comprising powering down the first bundle based on at least one of the bandwidth requirement and the bus performance.

14. The method of claim 11, wherein the bus further comprises at least one control signal for controlling the first bundle and the second bundle.

15. The method of claim 11, further comprising negotiating a number of lanes in the first plurality of lanes between the host and the target.

16. The method of claim 11, wherein the bus performance is evaluated based on a bus utilization.

17. The method of claim 11, further comprising configuring the second bundle to communicate control signals.

18. The method of claim 11, further comprising dynamically changing during running of the application at least one of a number of lanes in the first plurality, a symbol length, a bandwidth, an encoding, a cyclic redundancy check, and an error-correcting code of the first bundle.

19. The method of claim 11, wherein the first bundle comprises sixteen lanes and implements an 128b/130b encoding and the second bundle comprises one lane and implements an 8b/10b encoding.

20. The method of claim 11, wherein the first bundle is a clock-data-recovery bundle and the second bundle is a source-synchronous bundle.

\* \* \* \* \*